3,295,792
TOWED GLIDER
Harry E. Rollins, Garden Grove, and Cecil E. Craigo, Whittier, Calif., assignors, by mesne assignments, to the United States of America as represented by the Secretary of the Army
Filed July 19, 1965, Ser. No. 473,252
3 Claims. (Cl. 244—2)

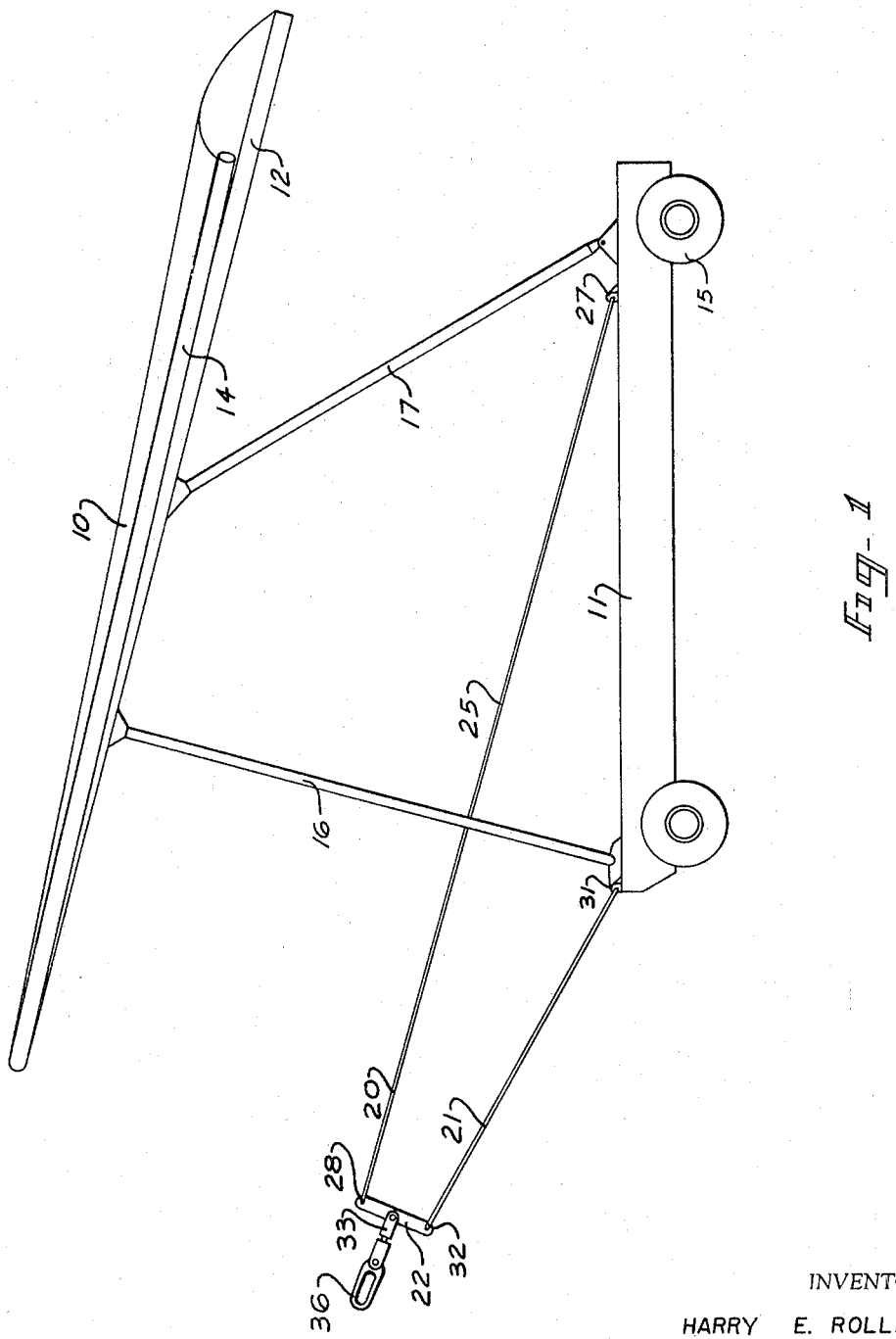

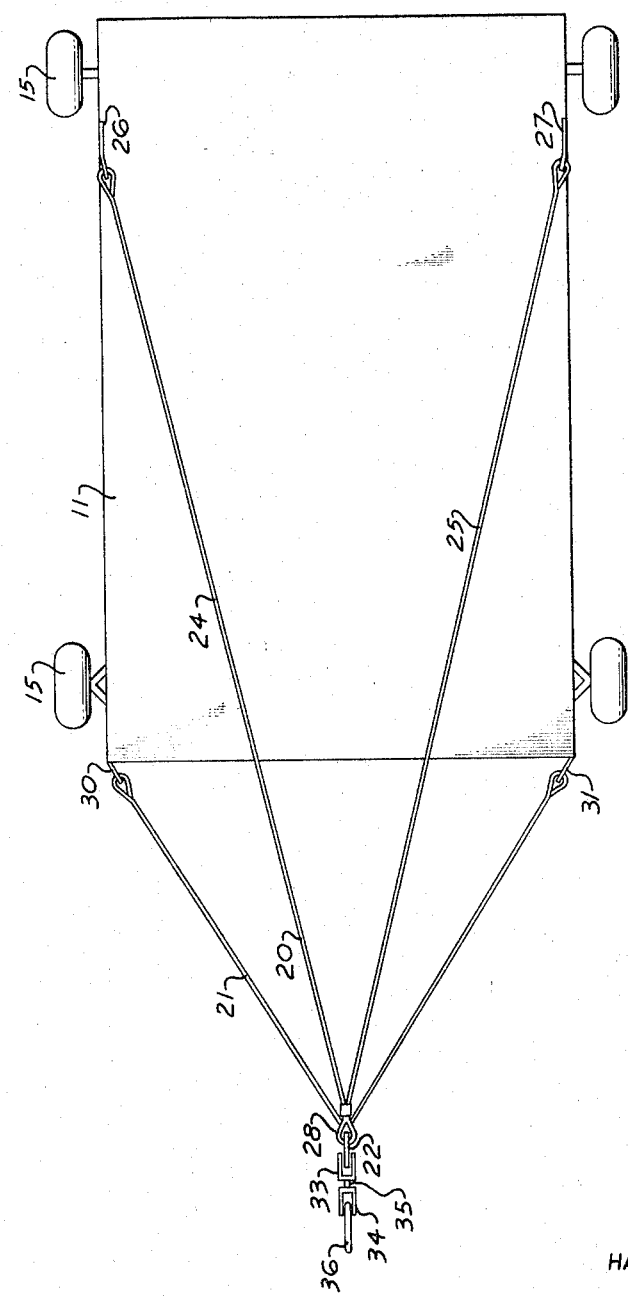

The invention disclosed herein may be manufactured and used by or for the Government for governmental purposes without payment to me of any royalty thereon.

This invention relates to improvements in load carrying gliders and more particularly to a glider adapted to be towed by a power operated aircraft.

In the course of military operations it at times becomes necessary to resupply temporarily isolated combat units. As a rule such units can not be resupplied by means of land vehicles and it is not possible for aircraft to land or take off. Sometimes resupply can be accomplished by helicopter but in an active combat area a helicopter is too vulnerable a target to risk such an operation. The final resort, then, has been to attempt to deliver the necessary supplies and equipment by air drop. This method also involves problems as the drop by parachute may be too far from the unit to be recovered or may be captured.

To overcome these difficulties suitable gliders are being developed to transport resupply cargo at high speed from cargo carrying aircraft directly to the locations of the units for whom the cargo is intended. These gliders are controllable and are equipped with electronic control apparatus responsive to remote control signals or to homing signals from the locations at which they are to land. This type of equipment permits the rapid and precise drop of resupply cargo to the units requiring this service.

The gliders used in this type of operation are of two classes, vis, those that are carried to the drop area inside the cargo aircraft and are deployed from the aircraft in loaded condition and those that are towed by an aircraft, which need not necessarily be a cargo carrying aircraft. Gliders of the latter class are generally used for carrying heavy or bulky items that cannot be easily deployed from a cargo aircraft or where cargo aircraft are not available in sufficient quantity.

The present invention relates to this latter class of gliders and has among its objects the provision of a towable glider and load carrier with towing apparatus effective to securely connect the glider to a towing aircraft and permit release of the glider from the aircraft at a selected time.

A further object resides in the provision of improved towing apparatus which will automatically keep the glider in proper trim while it is being towed.

A still further object resides in the provision of improved towing apparatus which can be quickly accurately adjusted for various conditions of the towed glider and its load.

Other objects and advantages will become apparent from a consideration of the following description and the appended claims in conjunction with the accompanying drawings wherein:

FIG. 1 is a side elevational view of a tow glider assembly including towing apparatus illustrative of the invention; and FIG. 2 is a top plan view of the assembly illustrated in FIG. 1 with the glider wing removed.

With continued reference to the drawings, the numeral 10 generally indicates the glider wing and the numeral 11 generally indicates the load carried by the glider. The wing 10 is of triangular shape and has a keel 12 extending from the forward apex of the triangle to the center of the base. Lateral spars, as indicated at 14, are disposed one at each side of the keel and extend from the apex to the corresponding corners of the base and a spreader bar, not illustrated, extends between the spars to maintain the triangular configuration of the wing. A covering or diaphrgam of flexible sheet material is secured along diverging sides to the spars and along its mid-width line to the keel. This is a flexible wing glider well known to the art. Control is obtained by raising and lowering the apex or nose of the wing and by moving or bending the spars. In particular, the lift capability and rate of climb or descent is controlled by changing the front to rear attitude or incidence of the wing.

The load or load carrier 11 may include a rectangular platform or hollow body supported on wheels. The wheels, as indicated at 15, are disposed one at each corner of the platform or body and support the body by means of suitable axles or spindles, not illustrated. The body is connected to the wing by strut assemblies 16 and 17, each assembly comprising a pair of struts connected at their lower ends to platform or body 11 at respectively opposite sides thereof, and converging to a common connection to the keel 12. These strut assemblies are spaced apart longitudinally of the body and arranged to maintain the body at a predetermined attitude or incidence relative to the body and against movement relative to the body.

The towing apparatus comprises two towing bridles 20 and 21, each comprising a pair of cables converging from connections to the body 11 to a differential or balancing lever 22.

The bridle 20 has two cables 24 and 25 connected at their rearward ends to body 11 at corresponding rear corners of the body by connecting brackets or lugs 26 and 27 and at their forward ends to the upper end of bar 22. While members 24 and 25 have been described as two separate cables, they obviously may be two parts of a single cable connected at its mid-length location to the bar 22 by an eye or loop 28.

The bridle 21 has two cables or cable portions connected at corresponding ends to load body 11 at respectively opposite front corners of the body by suitable brackets or lugs 30 and 31. These cables or cable portions are connected at their forward ends to the lower end of bar 22 by an eye or loop 32.

A clevis 33 is pivotally connected to bar 22 at a selected location between the ends of the bar, in some cases at the mid-length location of the bar, and an oppositely facing clevis 34 is secured to clevis 33 by a swivel connection 35. The main tow cable 36 is connected at one end to clevis 34, the other end being connected to the towing aircraft by a suitable releasable connection, not illustrated.

With the above described tow bridle arrangement the pull of the main tow cable is exerted on the bar 22 at a location along the length of the bar and is applied by the bar to the two tow bridles in proportion to the distances between the point of attachment of the main tow cable and the points of attachment of the tow bridles to the bar. Thus, by properly selecting the point of attachment of the main tow cable, the draft line of the tow cable can be made to pass substantially through the center of gravity of the load. Any departure of the load, including the body 11, from this condition will create a restoring force which will return the glider to its normal flight position. By thus maintaining equal forces or accurately proportioned forces on the front and rear ends of the load while the glider is being towed, the glider will have a floating action and will tend to return promptly from any excursions from its normal altitude relative to the altitude of the towing aircraft and from any departure from the proper angle of incidence.

While a particular embodiment has been hereinabove described and illustrated in the accompanying drawings for the purpose of disclosing the invention, it is to be understood that the scope of the invention is not limited to the particular embodiment so illustrated and described but is commensurate with the scope of the appended claims.

We claim:

1. In combination with a glider including a rectangular load support and a wing disposed above and operatively connected to said load support, towing apparatus comprising a vertically arranged equalizing bar, a main tow cable connected to said bar intermediate the ends thereof, a first towing bridle connected to said load support adjacent the rear corners of the support and to the upper end of said equalizing bar, and a second tow bridle connected to said load support adjacent the front corners of said support and to the lower end of said equalizing bar.

2. In combination with a towable glider having a rectangular load support and a wing disposed above and attached to said load support, tow bridles connected to the rearward and forward ends of said load support and extending forwardly therefrom, and means connecting said tow bridles to a tow cable comprising an equalizing bar connected at its opposite ends to said tow bridles, and a swivel connection pivotally connected to said bar intermediate the ends thereof for connecting a tow cable to said bar.

3. In combination with a towable glider comprising a flexible wing and an elongated load disposed below and connected to the wing, a towing assembly comprising two towing bridles attached one to the front end and the other to the rear end of the load with each bridle comprising a pair of lines converging from respectively opposite sides of the load to a common connecting eye, a vertically disposed equalizing bar connected at its lower end to said one bridle and at its upper end to said other bridle, and means carried by said bar intermediate the ends thereof for connecting a tow cable to said bar in a manner such that the draft line of the tow cable passes substantially through the center of gravity of the load when the glider is in proper towing condition.

References Cited by the Examiner

UNITED STATES PATENTS

| 2,363,668 | 11/1944 | Groen | 114—235 |
| 2,524,863 | 10/1950 | White | 114—235 |
| 3,182,621 | 5/1965 | Fletcher | 224—2 |

FOREIGN PATENTS

| 1,353,830 | 1/1964 | France. |

MILTON BUCHLER, *Primary Examiner.*

T. MAJOR, *Assistant Examiner.*